US012010775B2

(12) United States Patent
Jiang

(10) Patent No.: US 12,010,775 B2
(45) Date of Patent: Jun. 11, 2024

(54) STAGE LIGHT FIXTURE WITH OPTICAL PARAMETER DETECTION FUNCTION

(71) Applicant: Guangzhou Haoyang Electronic Co., Ltd., Shi Ji Town (CN)

(72) Inventor: Weikai Jiang, Shi Ji Town (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 18/149,010

(22) Filed: Dec. 30, 2022

(65) Prior Publication Data

US 2023/0276554 A1  Aug. 31, 2023

Related U.S. Application Data

(63) Continuation of application No. PCT/CN2022/107906, filed on Jul. 26, 2022.

(30) Foreign Application Priority Data

Feb. 28, 2022 (CN) .......................... 202220413477.2

(51) Int. Cl.
*H05B 47/00* (2020.01)
*F21V 14/04* (2006.01)
(Continued)

(52) U.S. Cl.
CPC ........... *H05B 47/105* (2020.01); *F21V 14/04* (2013.01); *F21V 21/30* (2013.01); *F21V 23/00* (2013.01);
(Continued)

(58) Field of Classification Search
CPC ....... H05B 47/105; F21V 14/04; F21V 21/30; F21V 23/00; F21V 2200/00; F21W 2131/406
See application file for complete search history.

(56) References Cited

U.S. PATENT DOCUMENTS

2018/0066988 A1* 3/2018 Margraf .................. F21V 7/043
2020/0109833 A1* 4/2020 Jiang ....................... F21S 19/00
(Continued)

FOREIGN PATENT DOCUMENTS

| CN | 102156038 A | 8/2011 |
|---|---|---|
| CN | 107795960 A | 3/2018 |

(Continued)

*Primary Examiner* — Gerald J Sufleta, II
(74) *Attorney, Agent, or Firm* — MUNCY, GEISSLER, OLDS & LOWE, P.C.

(57) ABSTRACT

A stage light fixture with an optical parameter detection function includes a light head, a supporting arm and a case. A light source for generating a light path, a light guiding member for guiding light to deviate from the light path, and an optical parameter detector are provided in the light head. The light guiding member can be freely switched into/out of the light path via a driving mechanism. The optical parameter detector can receive and detect the light guided out by the light guiding member. According to the present invention, the light guiding member can be switched into the light path to guide the light to the optical parameter detector for detection, only when the stage light fixture is started to work, or detection is performed at an interval between operations of the stage light fixture, while switched out of the light path when in operation.

20 Claims, 3 Drawing Sheets

(51) Int. Cl.
  *F21V 21/30* (2006.01)
  *F21V 23/00* (2015.01)
  *H05B 47/105* (2020.01)
  *F21W 131/406* (2006.01)

(52) U.S. Cl.
  CPC .... *F21V 2200/00* (2015.01); *F21W 2131/406* (2013.01)

(56) References Cited

U.S. PATENT DOCUMENTS

| | | | | |
|---|---|---|---|---|
| 2023/0049483 A1* | 2/2023 | Joergensen | ............ | F21S 10/007 |
| 2023/0175979 A1* | 6/2023 | Honda | ............... | G01N 21/8806 |
| | | | | 356/446 |

FOREIGN PATENT DOCUMENTS

| | | | | |
|---|---|---|---|---|
| CN | 110261387 | A | | 9/2019 |
| CN | 110542025 | A | | 12/2019 |
| CN | 213576992 | U | | 6/2021 |
| CN | 213872488 | U | | 8/2021 |
| CN | 219640069 | U | * | 9/2023 |
| JP | 2018194466 | A | | 12/2018 |

* cited by examiner

STAGE LIGHT FIXTURE WITH OPTICAL PARAMETER DETECTION FUNCTION

CROSS REFERENCE TO RELATED APPLICATIONS

The present application is a continuation of International Application No. PCT/CN2022/107906, filed on Jul. 26, 2022, which claims priority from Chinese Invention Application No. 202220413477.2 filed on Feb. 28, 2022, all of which are hereby incorporated herein by reference.

TECHNICAL FIELD

The present invention relates to the technical field of stage light fixtures, and more particularly, relates to a stage light fixture with an optical parameter detection function.

BACKGROUND

As well known, stage light fixtures are common stage equipment with high requirements for optical parameters of light beams projected. However, current stage light fixture lacks a feedback mechanism for the light beam projected. Therefore, it is impossible to know whether optical parameters of the light beam projected meet the requirements. Consequently, in the long-term use process of the light fixture, it is not timely available on light attenuation or damage, and it is difficult to achieve uniformity in color or brightness when different light fixtures are used cooperatively.

SUMMARY

In view of the above-mentioned, the present invention thus provides a stage light fixture with an optical parameter detection function, which can detect optical parameters of a light beam projected by a light source at any time.

According to the present invention, a stage light fixture with an optical parameter detection function is provided, which includes a light head, a supporting arm for supporting the light head to rotate, and a case for supporting the supporting arm to rotate. The light head is provided with a light source for generating a light path, a light guiding member for guiding light to deviate from the light path, and an optical parameter detector. The light guiding member is configured to freely switch into/out of the light path via a driving mechanism. The optical parameter detector is configured to receive and detect the light guided out by the light guiding member.

According to the present invention, the light emitted by the light source can be guided to the optical parameter detector by a light guiding member which can be freely switched into/out of the light path. Therefore, parameters such as brightness and color of the light source can be detected to obtain the detailed parameters of the light emitted by the light source, the light source thus can be corrected according to the parameters obtained to make the optical parameter thereof in an ideal value, thereby achieving more accurate controlling over the optical parameter.

The light guiding member in the present invention will not affect projection effects of the light beams, as the light guiding member can be freely switched into/out of the light path. Specifically, according to the present invention, it can be switched into the light path to guide the light to the optical parameter detector for detection, only when the stage light fixture is started to work, or detection is performed at an interval between operations of the stage light fixture. While the light guiding member is switched out of the light path when the stage light fixture is in operation. Accordingly, the light guiding member will not affect projection effects of the light beams.

In addition, at least part of the light of the light source is firstly guided out by the light guiding member, and is then detected by the optical parameter detector, rather than directly putting the optical parameter detector into the light path to directly receive and detect the light emitted from the light source 110, such configuration thus can avoid a cable connected to the optical parameter detector from damage caused by heat under direct irradiation of strong light of the light source, which will result in a short circuit.

According to at least one embodiment of the present invention, the light guiding member can be a reflecting mirror. In such configuration, the light is guided by the light guiding member under the principle of reflection, which can void continuous guidance, once the light is reflected, additional elements thus are not required, thereby saving space.

Further, the reflecting mirror can be a reflecting bowl, so that reflected light can be focused on the optical parameter detector. The light emitted by the light source is typically non-parallel light, and will continue to diverge after being reflected by a plane mirror, which is not conducive to detection by the optical parameter detector. The reflected light thus is focused on the optical parameter detector by the reflecting bowl, according to the present invention, which facilitates detection.

Furthermore, the reflecting mirror preferably performs diffuse reflection. The light source of the stage light fixture generally has higher power and stronger illumination, which easily exceeds detection range of the optical parameter detector or requires a higher-price device with a wider measuring range. However, the intensity of the guided light can be reduced by diffuse reflection. Original optical parameters of the light source 110 in such situation can be obtained by weighting the detection results of the optical parameter detector according to degrees of roughness of the reflecting surface of the reflecting mirror. The requirements for the optical parameter detector thus can be lowered by the design of diffuse reflection, which is especially required to reduce the intensity of the guided light in the situation that the light of the light source is directly detected in the light head.

According to the present invention, when the light guiding member is switched into the light path, the light guiding member is better to be located close to a focal point of the light path emitted by the light source, so that all the light in the light path can be guided to the optical parameter detector. The light emitted by the light source is most concentrated at the focal point, so the light guiding member arranged close to the focal point can facilitate directly guiding all the light of the light source to the optical parameter detector for detection. With such configuration, the optical parameters of the light emitted by the light source thus can be overall detected.

However, in other embodiments, when the light guiding member is switched into the light path, only part of the light in the light path can be guided to the optical parameter detector by the light guiding member. Especially, when a bubble light fixture is used as the light source. Such light source has a small luminous point, the light path is thus more balanced as a whole, and the optical parameters at different positions are almost identical, so that the optical parameters of the whole light path can be obtained by performing sampling detection on the light path.

In such case, the light guiding member can be driven to move in the light path by the driving mechanism, and during the movement of the light guiding member, the optical parameter detector always keeps receiving the light guided by the light guiding member. Especially, when LEDs are used as the light source, a number of LED beads are usually arranged together to form the light source as a whole. Therefore, it is possible to acquire the optical parameters of each region in the light path by driving the light guiding member to move in the light path via the driving mechanism, and further to obtain whether the LEDs in an LED array are locally damaged or light attenuated. That is, self-inspection of the light source can be achieved.

In order to reduce installation of additional elements and save the space in the light head, the light guiding member can be an existing CMY assembly.

In the present invention, in the light head, a focusing lens, a magnifying lens, and a light emitting lens can be further successively provided along the light emitting direction of the light source. The focusing lens is configured to adjust the definition of projected light spots, the magnifying lens is configured to adjust the size of the projected light spots, and the light emitting lens is configured to further concentrate the light to narrow divergence angle of the light path.

According to the present invention, optical parameters detected by the optical parameter detector may include at least one of an illumination intensity, a color, a color temperature, a color rendering index and a blue light intensity.

In other embodiments of the present invention, the light guiding member can be a light guide. In such configuration, the light will be moved forward within the light guide under total reflection, the light is thus guided to the optical parameter detector to be detected.

Figure 1:
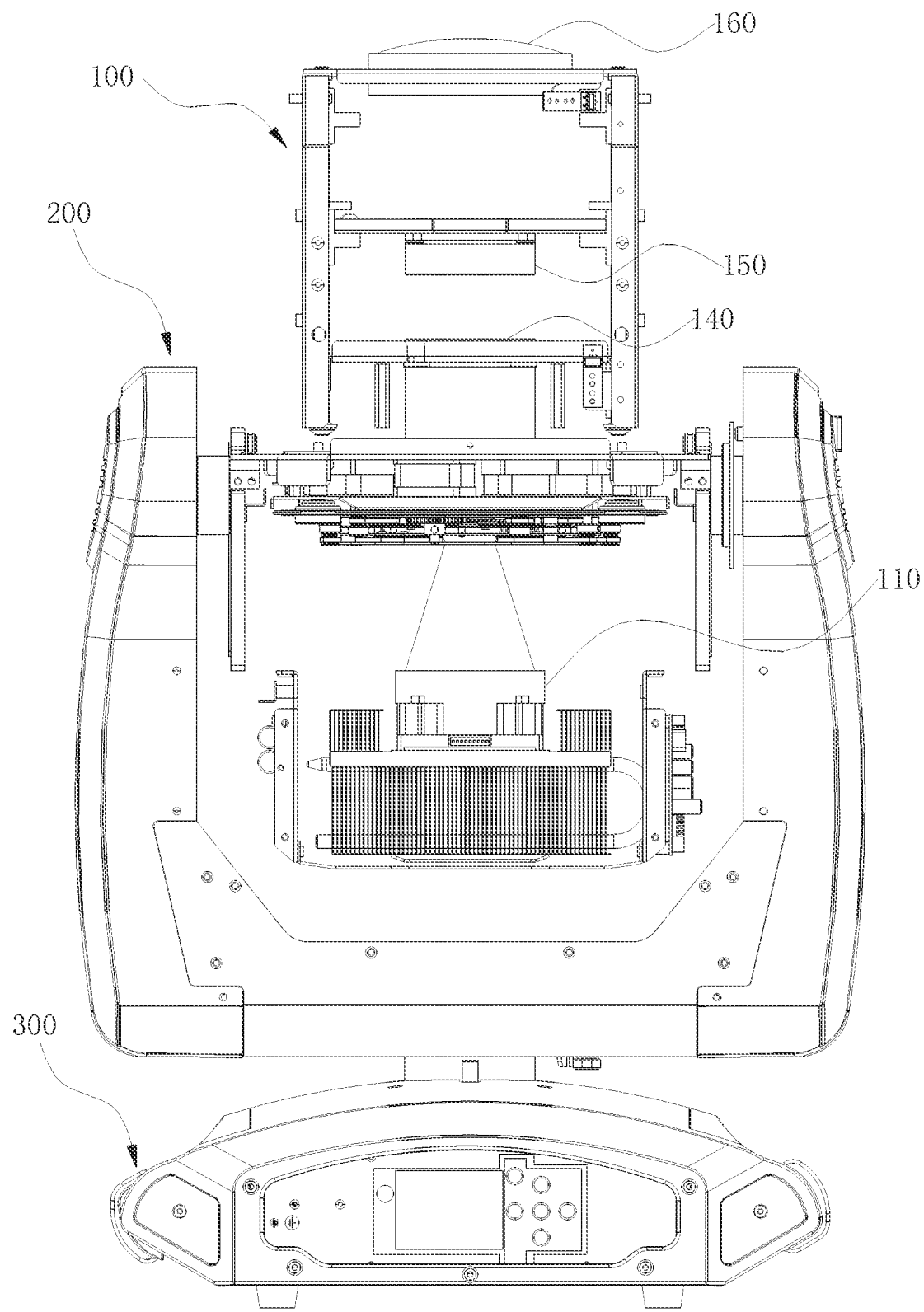
FIG. 1 is a schematic structural diagram of a stage light fixture with an optical parameter detection function according to the present invention.

In the drawings:
100: light head; 110: light source; 120: light guiding member; 130: optical parameter detector; 140: focusing lens; 150: magnifying lens; 160: light emitting lens; 171: CMY assembly; 172: strobe; 173: color filter disk; 174: gobo; 180: light attenuating member; 200: supporting arm; 300: case.

DETAILED DESCRIPTION

The accompanying drawings are for exemplary illustration only, and should not be construed as limitations on this patent; in order to better illustrate this embodiment, some parts in the accompanying drawings may be omitted, enlarged or reduced, and they do not represent the size of the actual product; for those skilled in the art, it is understandable that certain well-known structures and descriptions thereof in the accompanying drawings may be omitted. The positional relationship described in the accompanying drawings is only for exemplary illustration, and should not be construed as limitations on this patent.

Referring to FIG. 1, a stage light fixture with an optical parameter detection function is provided according to one embodiment, which includes a light head 100, a supporting arm 200 for supporting the light head 100 to rotate, and a case 300 for supporting the supporting arm 200 to rotate. In the light head 100, a light source 110 for generating a light path, a light guiding member 120 for guiding light to deviate from the light path, and an optical parameter detector 130 are arranged. The light guiding member 120 can be freely switched into/out of the light path by a driving mechanism. The optical parameter detector 130 is configured to receive and detect the light guided out by the light guiding member 120.

According to the present invention, the light guiding member 120 is configured to freely switch into/out of the light path, the light emitted by the light source 110 thus can be guided to the optical parameter detector 130 by the light guiding member 120, parameters such as brightness and color of the light emitted by the light source 110 are detected by the optical parameter detector 130. Therefore, detailed parameters of the light emitted by the light source 110 can be obtained according to the stage light fixture of the present embodiment, the light source 110 thus can be corrected according to the parameters obtained to make the optical parameter thereof in an ideal value, thereby achieving more accurate controlling over the optical parameter.

The light guiding member 120 in the present embodiment will not affect projection effects of the light beams. As the light guiding member 120 can be freely switched into/out of the light path according to demands. Specifically, according to the present embodiment, it can be switched into the light path, only when the stage light fixture is started to work, to guide the light to the optical parameter detector 130 for detection, or detection is performed at an interval between operations of the stage light fixture, while the light guiding member 120 will be switched out of the light path during operation of the stage light fixture, Accordingly, the light guiding member 120 will not affect projection effects of the light beams.

In addition, according to the present embodiment, the light emitted from the light source 110 is firstly guided out by the light guiding member 120, and is then detected by the optical parameter detector 130, rather than directly putting the optical parameter detector 130 into the light path to directly receive and detect the light emitted from the light source 110, such configuration thus can avoid a cable connected to the optical parameter detector 130 from damage caused by heat under direct irradiation of strong light of the light source 110, which will result in a short circuit.

The driving mechanism in the present embodiment may be a screw motor to drive the optical parameter detector 130 to move linearly, or may be a conventional motor to drive the optical parameter detector 130 to move in an arc shape via a swing arm. The driving mechanism may also include two motors, which cooperate to make the optical parameter detector 130 move in two directions on the same plane, or include three motors combined to make the movement of the optical parameter detector 130 beyond the plane.

The light guiding member 120 can be a reflecting mirror according to a preferable embodiment. The light guiding member 120 thus guides the light according to the principle of reflection, which can avoid continuous guidance once the light is reflected, additional elements are not required, thus tacking up less space. The reflecting mirror may be glass or other objects that can reflect light. In other embodiments, the light guiding member 120 may also be a light guide or optical fiber.

The reflecting mirror can be preferably a reflecting bowl, reflected light thus can be focused on the optical parameter detector 130. As the light emitted by the light source 110 is non-parallel light, which will converge before the focal point and diverge after the focal point, and will continue to diverge after being reflected by a plane mirror, such light will not be detected by the optical parameter detector 130. However, the reflected light can be focused on the optical parameter detector 130 by the reflecting bowl, such focused light can be easily detected.

Figure 2:
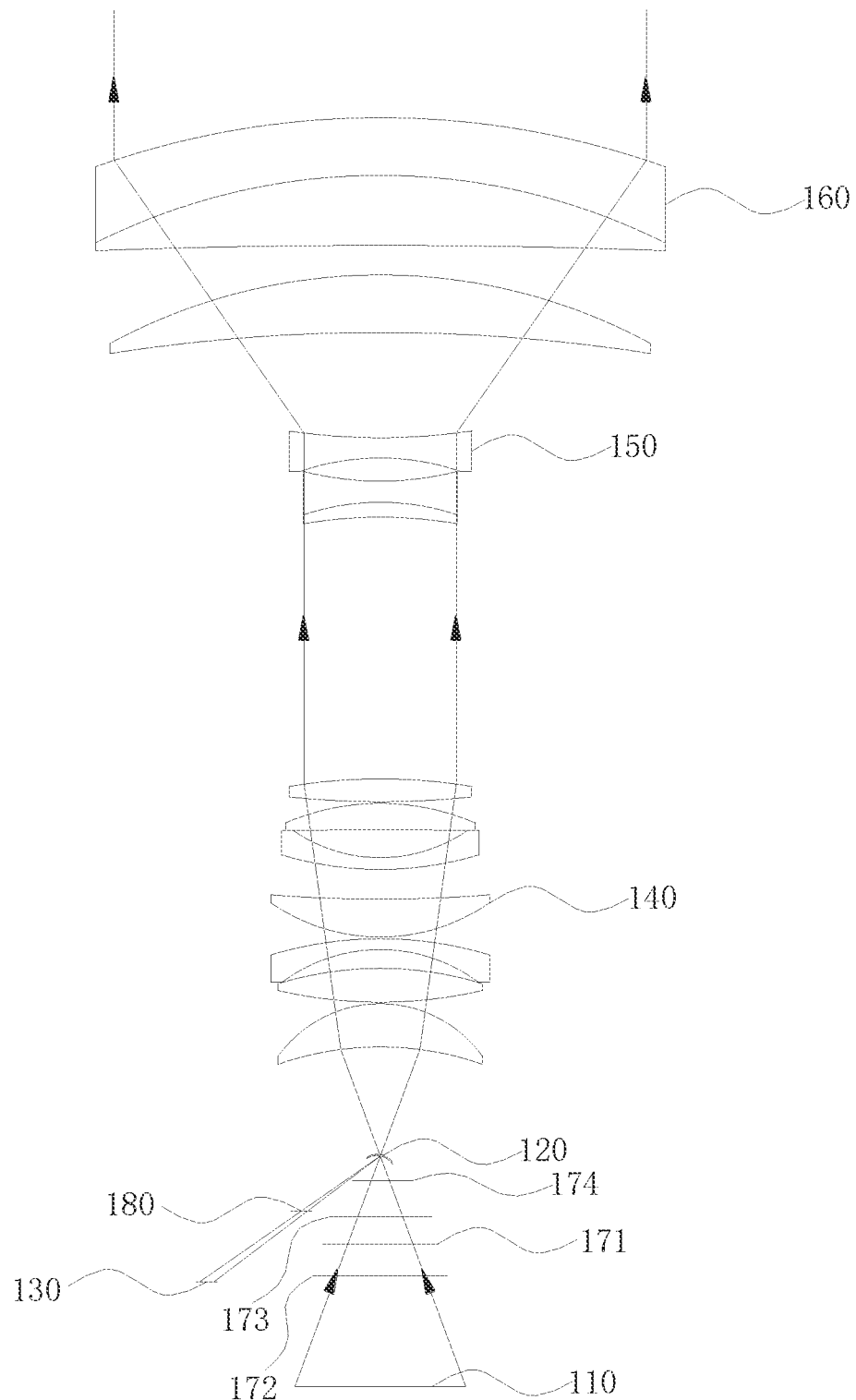
FIG. 2 is a schematic structural diagram of a light path of a stage light fixture according to one embodiment of the present invention.

The optical parameter detector 130 is located at a focal point of the reflecting bowl according to a preferable embodiment, as FIG. 2 shown.

The reflecting mirror can perform diffuse reflection. As known, the light source 110 of the stage light fixture has higher power and stronger illumination, which will easily exceed detection range of the optical parameter detector 130 or require a higher-price device with a wider measuring range. However, intensity of the guided light can be reduced by diffuse reflection. Original optical parameters of the light source 110 can be obtained by weighting the detection results of the optical parameter detector 130 according to degrees of roughness of the reflecting surface of the reflecting mirror. The requirements for the optical parameter detector 130 thus can be lowered by the design of diffuse reflection, which is especially required to reduce the intensity of the guided light in the situation that the light of the light source 110 is directly detected in the light head 100.

Figure 3:
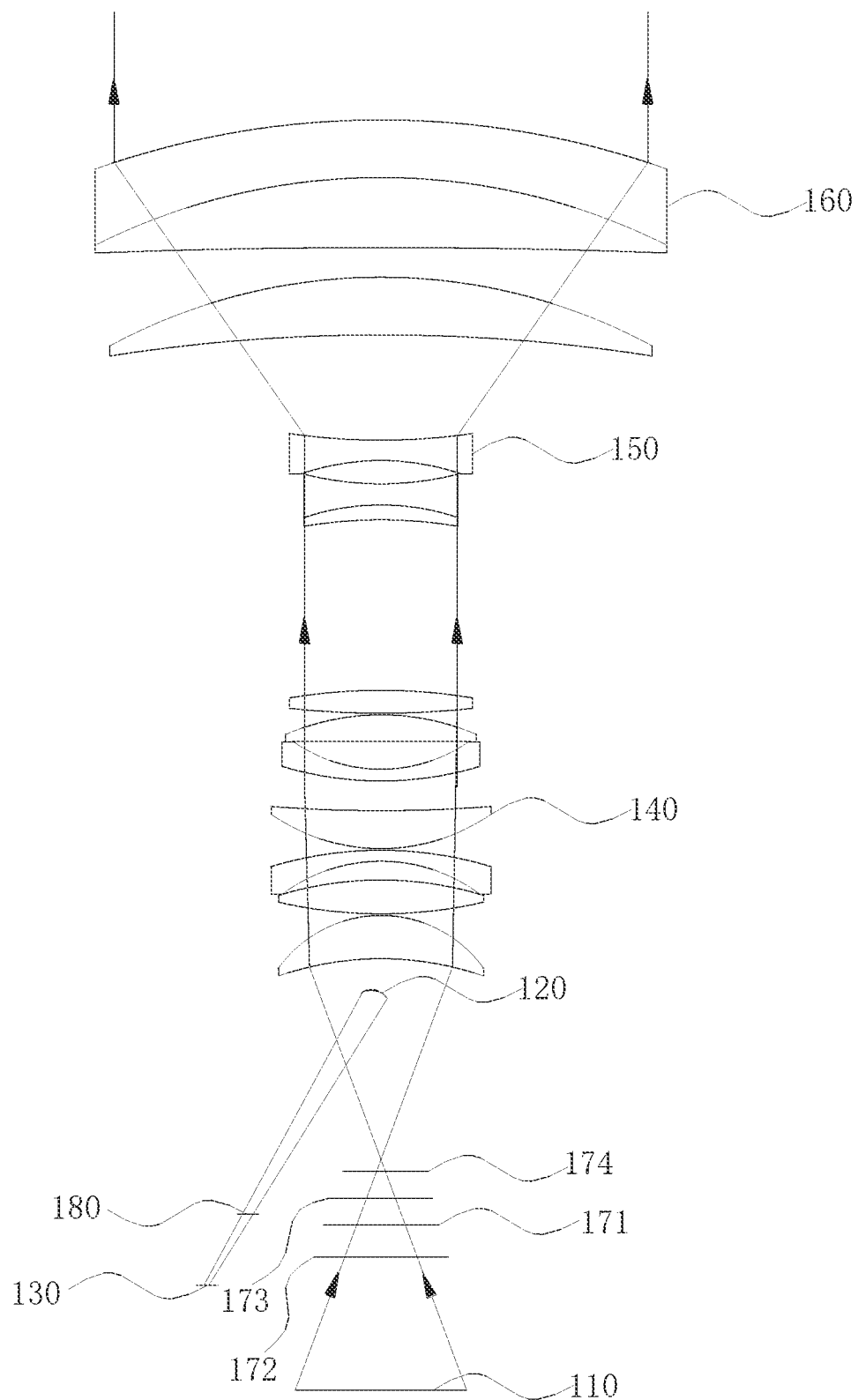
FIG. 3 is a schematic structural diagram of a light path of a stage light fixture according to another embodiment of the present invention.

As shown in FIG. 2 and FIG. 3, a light attenuating member 180 can be provided between the light guiding member 120 and the optical parameter detector 130. In order to reduce light intensity of the reflected light, the light attenuating member 180 may be covered on the surface of the light guiding member 120, or may be covered a light inlet of the optical parameter detector 130, or may be independently arranged.

As FIG. 2 shown, when the light guiding member 120 is switched into the light path, the light guiding member 120 is better to be located close to a focal point of the light path emitted by the light source 110, which can guide all the light in the light path to the optical parameter detector 130. The light emitted by the light source 110 is most concentrated at the focal point, so the light guiding member 120 arranged close to the focal point can facilitate directly guiding all the light of the light source 110 to the optical parameter detector 130 for detection. With such configuration, the optical parameters of the light emitted by the light source 110 can be overall detected.

Referring to FIG. 3, in this embodiment, when the light guiding member 120 is switched into the light path, the light guiding member 120 is configured to guide only part of the light in the light path to the optical parameter detector 130. Especially, when a bubble lamp is used as the light source 110. Such light source 110 has a small luminous point, the light path is thus more balanced as a whole, and the optical parameters at different positions are almost identical, so that optical parameters of the whole light path can be obtained by performing sampling detection on the light path.

In such case, especially when the light source 110 are LEDs, in order to receive more lights, the light guiding member 120 is driven to move in the light path by the driving mechanism, and during the movement of the light guiding member 120, the optical parameter detector 130 always keeps receiving the light guided by the light guiding member 120. When LEDs are used as the light source 110, a number of LED beads are usually arranged together to form the light source 110 as a whole. Therefore, it is possible to acquire the optical parameters of each region in the light path by driving the light guiding member 120 to move in the light path via the driving mechanism, and further to know whether the LEDs in an LED array are locally damaged or light attenuated. That is, self-inspection of the light source 110 can be achieved.

Preferably, the driving mechanism is configured to drive the light guiding member 120 to travel through the entire cross section of the light path, so that light in each region can be detected by the optical parameter detector 130.

The light path of the light emitted by the light source 110 is unchanged. In order to ensure that the optical parameter detector 130 always keeps receiving the light guided by the light guiding member 120 during the movement of the optical parameter detector 130 in the light path, a corresponding positions relationship between the optical parameter detector 130 and the light guiding member 120 can be pre-set, which can achieve that when the light guiding member 120 is moved, the optical parameter detector 130 can be moved synchronously, or the optical parameter detector 130 can be deflected by a certain angle during the movement, thus keeping guiding the light to enter the optical parameter detector 130 all the time. The deflection angle can also be pre-set.

In the embodiment, as shown in FIG. 3, the light guiding member 120 is switched into the side of a focal point of the light path emitted from the light source 110 away from the light source 110. This is because a plurality of effect assemblies are provided between the focal point and the light source 110, including a CMY assembly 171, a shader 172, a color filter wheel 173, a gobo 174, the space between the focal point and the light source 110 will be very compact. As a result, such configuration that the light guiding member 120 is arranged on the side of the focal point away from the light source 110 may save space occupied between the focal point and the light source 110.

The light guiding member 120 can be the CMY assembly 171. The CMY assembly 171 is usually arranged obliquely, the existing CMY assembly 171 is directly used for guiding the light in the light path to the optical parameter detector 130, which thus can reduce installation of additional elements and save space in the light head 100.

A focusing lens 140, a magnifying lens 150, and a light emitting lens 160 can be further successively provided in the light head 100 in the light emitting direction of the light source 110. The definition of projected light spots can be adjusted by the focusing lens 140, the size of the projected light spots can be adjusted by the magnifying lens 150, and the light can be further concentrated by the light emitting lens 160 to narrow divergence angle of the light path.

Preferably, the focusing lens 140 or the magnifying lens 150 can be moved, a movement path of the focusing lens 140 or the magnifying lens 150 can pass through the plane where the light guiding member 120 is located. In such configuration, when it is required to detect the optical parameter of the light source 110, the focusing lens 140 or the magnifying lens 150 can be driven to avoid the light guiding member 120, so that the light guiding member 120 can be switched into the light path without interference; or when the focusing lens 140 or the magnifying lens 150 is not located in the plane where the light guiding member 120 is located, the light guiding member 120 is switched into the light path for detection. Due to the large motion range of the focusing lens 140 and the magnifying lens 150, enough space in such region is existed, so when the light guiding member 120 guides the light to the optical parameter detector 130, the light will not be shielded.

Optical parameters detected by the optical parameter detector 130 mentioned above may include at least one of an illumination intensity, a color, a color temperature, a color rendering index and a blue light intensity. Accordingly, the optical parameter detector 130 may be a brightness detector, a color detector or a blue light detector, etc.

According to other embodiments, the light guiding member 120 can be a light guide. The light will be moved forward within the light guide under the principle of total reflection, the light thus can be guided to the optical parameter detector to be detected.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements, etc. made within the spirit and principles of the present invention shall be included within the protection scope of the claims of the present invention.

The invention claimed is:

1. A stage light fixture with an optical parameter detection function, comprising a light head, a supporting arm for supporting the light head to rotate, and a case for supporting the supporting arm to rotate,
wherein a light source for generating light to form a light path, a light guiding member for guiding the light to deviate from the light path, and an optical parameter detector are provided in the light head, the light guiding member is configured to switch into the light path to guide the light to the optical parameter detector for detection, and is configured to switch out of the light path to allow the light to project out the light head along the light path via a driving mechanism, and the optical parameter detector is configured to receive and detect the light guided out by the light guiding member.

2. The stage light fixture according to claim 1, wherein the light guiding member is a reflecting mirror for reflecting the light to the optical parameter detector.

3. The stage light fixture according to claim 2, wherein the reflecting mirror is in form of a reflecting bowl, which focuses the light reflected on the optical parameter detector.

4. The stage light fixture according to claim 2, wherein the reflecting mirror is configured to perform diffuse reflection.

5. The stage light fixture according to claim 1, wherein when the light guiding member is switched into the light path, the light guiding member is located close to a focal point of the light path emitted by the light source, and all light in the light path is guided to the optical parameter detector by the light guiding member.

6. The stage light fixture according to claim 1, wherein when the light guiding member is switched into the light path, part of the light in the light path is guided to the optical parameter detector by the light guiding member.

7. The stage light fixture according to claim 6, wherein the light guiding member is configured to be driven to move along a cross section of the light path perpendicular to the light path by the driving mechanism, and the optical parameter detector is configured to continually receive the light guided by the light guiding member during a movement of the light guiding member.

8. The stage light fixture according to claim 1, wherein the light guiding member is a CMY assembly.

9. The stage light fixture according to claim 1, wherein a focusing lens, a magnifying lens and a light emitting lens are further successively provided in the light head along a light emitting direction of the light path.

10. The stage light fixture according to claim 1, wherein optical parameters detected by the optical parameter detector include at least one of an illumination intensity, a color, a color temperature, a color rendering index and a blue light intensity.

11. The stage light fixture according to claim 1, wherein the light guiding member is a light guide.

12. The stage light fixture according to claim 11, wherein the light guide operates via total internal reflection.

13. The stage light fixture according to claim 1, wherein a light attenuating member is provided between the light guiding member and the optical parameter detector.

14. The stage light fixture according to claim 13, wherein the light attenuating member is covered on a surface of the light guiding member.

15. The stage light fixture according to claim 7, wherein the light guiding member is driven by the driving mechanism to travel through the entire cross section of the light path.

16. The stage light fixture according to claim 7, wherein the optical parameter detector is further configured to move synchronously with the light guiding member.

17. The stage light fixture according to claim 7, wherein the optical parameter detector is configured to deflect by a certain angle during the movement of the light guiding member.

18. The stage light fixture according to claim 1, wherein when the light guiding member is switched into the light path, the light guiding member is located a side of a focal point of the light path away from the light source.

19. The stage light fixture according to claim 18, wherein a plurality of effect assemblies are provided between the focal point and the light source, including at least one of a CMY assembly, a shader, a color filter wheel, and a gobo.

20. The stage light fixture according to claim 9, wherein the focusing lens or the magnifying lens is movable, a movement path of the focusing lens or the magnifying lens passes through a plane where the light guiding member is located, and the focusing lens or the magnifying lens is configured to be driven to avoid the light guiding member when the light guiding member is switched into the light path.

* * * * *